United States Patent
Chu et al.

(10) Patent No.: US 11,531,681 B2
(45) Date of Patent: *Dec. 20, 2022

(54) ACCESSING LISTINGS IN A DATA EXCHANGE

(71) Applicant: Snowflake Inc., Bozeman, MT (US)

(72) Inventors: Pui Kei Johnston Chu, San Mateo, CA (US); Benoit Dageville, Foster City, CA (US); Matthew J. Glickman, Larchmont, NY (US); Christian Kleinerman, Burlingame, CA (US); Prasanna Krishnan, Palo Alto, CA (US); Justin Langseth, Kailua, HI (US)

(73) Assignee: Snowflake Inc., Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/704,783

(22) Filed: Mar. 25, 2022

(65) Prior Publication Data

US 2022/0215033 A1 Jul. 7, 2022

Related U.S. Application Data

(63) Continuation of application No. 17/015,485, filed on Sep. 9, 2020, now Pat. No. 11,308,116, which is a continuation of application No. 16/832,888, filed on Mar. 27, 2020, now Pat. No. 10,803,082, which is a continuation of application No. 16/684,355, filed on Nov. 14, 2019, now Pat. No. 10,642,856, which is a (Continued)

(51) Int. Cl.
*G06F 16/2455* (2019.01)
*G06F 16/25* (2019.01)
*G06F 21/62* (2013.01)

(52) U.S. Cl.
CPC ........ *G06F 16/254* (2019.01); *G06F 16/2456* (2019.01); *G06F 21/6218* (2013.01)

(58) Field of Classification Search
None
See application file for complete search history.

(56) References Cited

U.S. PATENT DOCUMENTS

| 6,480,850 B1 | 11/2002 | Veldhuisen |
| 6,898,593 B1 | 5/2005 | Mulukutla et al. |

(Continued)

OTHER PUBLICATIONS

International Preliminary Reporton Patentablility dated Nov. 16, 2021, for International Application No. PCT/US2020/031709, filed May 6, 2020, pp. 6.

(Continued)

*Primary Examiner* — Wilson Lee
(74) *Attorney, Agent, or Firm* — Womble Bond Dickinson (US) LLP

(57) ABSTRACT

A method for accessing listings in a data exchange includes creating a first listing in a data exchange, the first listing referencing a first database of a plurality of databases and specifying identity-based sharing of the first database, creating a second listing in the data exchange, the second listing referencing a second database of the plurality of databases and data of the first database shared according to the identity-based sharing of the first database, and receiving an instruction from a user of the data exchange, the instruction referencing the second listing and instructing the addition of the second listing to a set of consumed data shares accessible by the user.

20 Claims, 8 Drawing Sheets

Related U.S. Application Data continuation of application No. 16/428,592, filed on May 31, 2019, now Pat. No. 10,977,268.

(56) References Cited

U.S. PATENT DOCUMENTS

| | | | |
|---|---|---|---|
| 7,149,737 | B1 | 12/2006 | Luo et al. |
| 8,601,162 | B1 | 12/2013 | O'Shaughnessy |
| 8,655,826 | B1 | 2/2014 | Drewry et al. |
| 10,410,016 | B1 | 9/2019 | Damick |
| 10,462,637 | B1 | 10/2019 | Lifschultz |
| 10,510,465 | B1 | 12/2019 | Costa et al. |
| 10,642,856 | B1 | 5/2020 | Chu et al. |
| 10,803,082 | B1 | 10/2020 | Chu et al. |
| 10,977,268 | B2 | 4/2021 | Langseth et al. |
| 11,089,105 | B1 * | 8/2021 | Karumbunathan ..... G06F 3/065 |
| 11,139,955 | B1 * | 10/2021 | So ................... G06Q 20/3674 |
| 11,336,509 | B2 * | 5/2022 | Smith .................. H04L 49/356 |
| 2003/0061216 | A1 | 3/2003 | Moses |
| 2003/0105974 | A1 | 6/2003 | Griffin et al. |
| 2003/0120822 | A1 | 6/2003 | Langrind et al. |
| 2003/0130856 | A1 * | 7/2003 | Matsuo ................ G06Q 30/06 705/50 |
| 2003/0130857 | A1 * | 7/2003 | Matsuo ................ G06Q 10/109 705/50 |
| 2005/0149487 | A1 * | 7/2005 | Celik ................... H04M 1/2755 |
| 2006/0022048 | A1 | 2/2006 | Johnson |
| 2006/0274898 | A1 | 12/2006 | Pedlow, Jr. |
| 2006/0288009 | A1 | 12/2006 | Pieper et al. |
| 2007/0061266 | A1 | 3/2007 | Moore et al. |
| 2008/0172429 | A1 | 7/2008 | Lin et al. |
| 2008/0313730 | A1 | 12/2008 | Iftimie et al. |
| 2009/0063534 | A1 | 5/2009 | Halberstadt |
| 2009/0300002 | A1 | 12/2009 | Thomas et al. |
| 2011/0107088 | A1 | 5/2011 | Eng et al. |
| 2012/0059716 | A1 * | 3/2012 | Agarwal ................ G06Q 30/02 705/14.52 |
| 2012/0090037 | A1 | 4/2012 | Levit |
| 2012/0254143 | A1 | 10/2012 | Varma et al. |
| 2012/0278903 | A1 | 11/2012 | Pugh |
| 2012/0317200 | A1 | 12/2012 | Chan |
| 2013/0174223 | A1 * | 7/2013 | Dykeman ................ G06F 21/10 726/4 |
| 2013/0318582 | A1 | 11/2013 | McCann et al. |
| 2014/0019352 | A1 | 1/2014 | Shrivastava |
| 2014/0032579 | A1 | 1/2014 | Merriman et al. |
| 2014/0040579 | A1 | 2/2014 | Kripalani |
| 2014/0244429 | A1 | 8/2014 | Clayton et al. |
| 2014/0298481 | A1 | 10/2014 | Gilroy et al. |
| 2014/0304505 | A1 | 10/2014 | Dawson |
| 2014/0380051 | A1 | 12/2014 | Branish, II et al. |
| 2014/0380408 | A1 | 12/2014 | Ginter et al. |
| 2015/0059003 | A1 | 2/2015 | Bouse |
| 2015/0082392 | A1 | 3/2015 | Gregg et al. |
| 2015/0142742 | A1 * | 5/2015 | Hong ................... G06F 16/137 707/634 |
| 2015/0227890 | A1 * | 8/2015 | Bednarek ........... G06Q 10/0833 705/26.81 |
| 2016/0132805 | A1 * | 5/2016 | Delacourt .............. G06Q 10/00 705/7.23 |
| 2016/0239681 | A1 | 8/2016 | Plattner et al. |
| 2017/0005972 | A1 | 1/2017 | Reimer |
| 2017/0041354 | A1 * | 2/2017 | Lattanzi .............. H04L 65/1089 |
| 2017/0097760 | A1 | 4/2017 | Coppola |
| 2017/0249461 | A1 | 8/2017 | Permeh et al. |
| 2018/0011461 | A1 | 1/2018 | Camarasa et al. |
| 2018/0041467 | A1 | 2/2018 | Vats et al. |
| 2018/0089266 | A1 | 3/2018 | Vujic et al. |
| 2018/0091484 | A1 | 3/2018 | Atta et al. |
| 2018/0196955 | A1 | 7/2018 | Dageville et al. |
| 2018/0218053 | A1 | 8/2018 | Koneru |
| 2018/0270290 | A1 | 9/2018 | Sinha et al. |
| 2018/0300714 | A1 | 10/2018 | Lieberman et al. |
| 2018/0337794 | A1 | 11/2018 | Casaletto et al. |
| 2018/0375762 | A1 | 12/2018 | Bansal et al. |
| 2019/0182616 | A1 * | 6/2019 | Kamath ................ H04L 67/535 |
| 2019/0243911 | A1 | 8/2019 | Kobozev et al. |
| 2019/0303587 | A1 | 10/2019 | Hamel et al. |
| 2019/0312734 | A1 | 10/2019 | Wentz et al. |
| 2019/0318122 | A1 | 10/2019 | Hockey et al. |
| 2019/0347666 | A1 | 11/2019 | Bermudez-Cisneros et al. |
| 2019/0349426 | A1 | 11/2019 | Smith et al. |
| 2020/0034160 | A1 | 1/2020 | Koren et al. |
| 2020/0045016 | A1 | 2/2020 | Chor et al. |
| 2020/0097141 | A1 | 3/2020 | Jacobson et al. |
| 2020/0110838 | A1 | 4/2020 | Pasha et al. |
| 2020/0117824 | A1 | 4/2020 | Upadhyay et al. |
| 2020/0125700 | A1 | 4/2020 | Chang et al. |
| 2020/0184094 | A1 | 6/2020 | Chan et al. |
| 2020/0204527 | A1 | 6/2020 | Vass et al. |
| 2020/0304507 | A1 | 9/2020 | Pandey et al. |
| 2020/0311785 | A1 | 10/2020 | Lagrand et al. |

OTHER PUBLICATIONS

The International Search Report and Written Opinion of the International Searching Authority for PCT Application No. PCT/US2020/031709 dated Jul. 24, 2020, 13 pages.

* cited by examiner

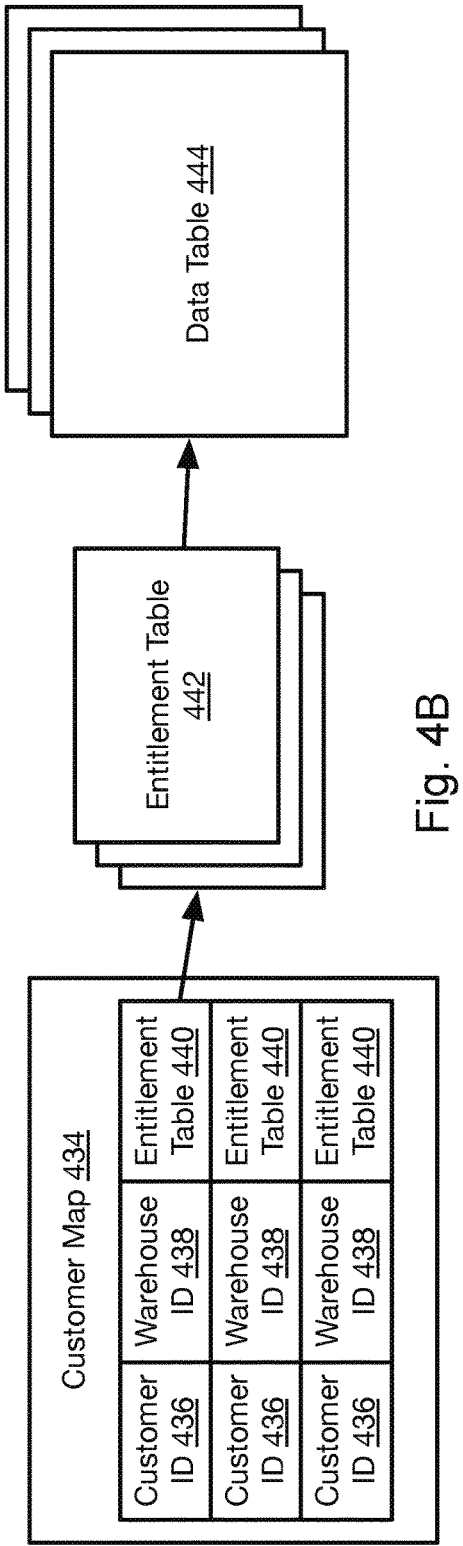
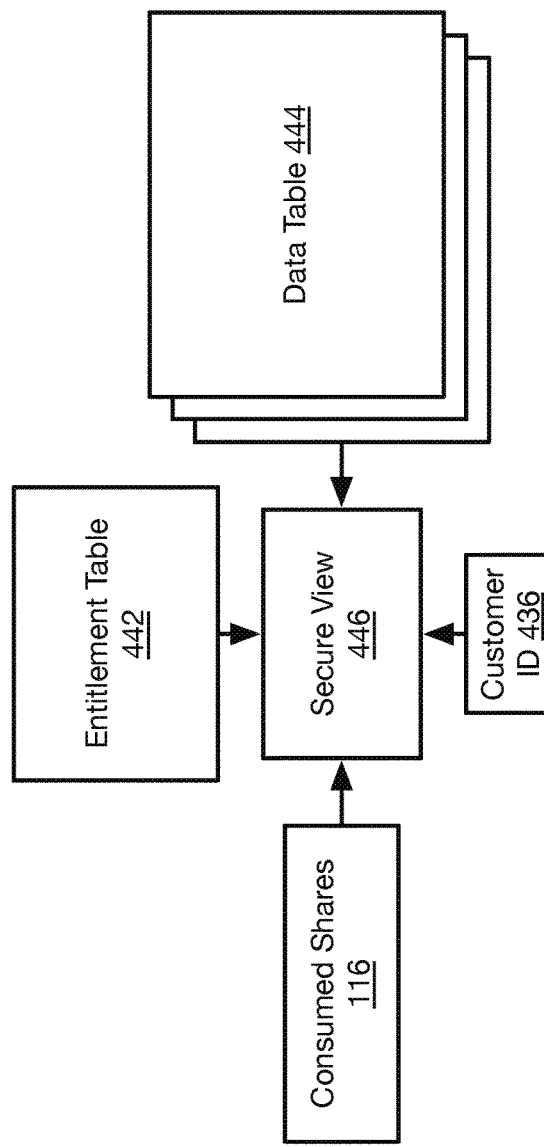
Fig. 4B
Fig. 4C

ACCESSING LISTINGS IN A DATA EXCHANGE

CROSS-REFERENCE TO RELATED APPLICATION

This application is a continuation of U.S. application Ser. No. 17/015,485, filed Sep. 9, 2020, entitled "ACCESSING LISTINGS IN A DATA EXCHANGE," which is a continuation of U.S. application Ser. No. 16/832,888, filed Mar. 27, 2020, entitled "DATA EXCHANGE," now U.S. Pat. No. 10,803,082, issued Oct. 13, 2020, which is a continuation of U.S. application Ser. No. 16/684,355, filed Nov. 14, 2019, now U.S. Pat. No. 10,642,856, issued May 5, 2020, which is a continuation of U.S. application Ser. No. 16/428,592, filed May 31, 2019, now U.S. Pat. No. 10,977,268, issued Apr. 13, 2021, the entire contents of which are hereby incorporated by reference.

TECHNICAL FIELD

The present disclosure relates to resource management systems and methods that manage data storage and computing resources.

BACKGROUND

The amount of data generated on a daily basis is astounding. In a diverse ecosystem of many service providers, merchants, customers, data repositories, and other entities, there are many sources of data. Data science applications and machine learning techniques are able to use data to provide insights, detect anomalies, and perform other useful functions. However, these techniques are limited by the amount of data available and the subject matter areas represented by the available data.

It would be an advancement in the art to improve the availability of data for use in such applications.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 4B is a diagram illustrating data used for implementing private sharing of data in accordance with an embodiment of the present invention;

FIG. 4C is a diagram illustrating a secure view for implementing private sharing of data in accordance with an embodiment of the present invention;

DETAILED DESCRIPTION

Figure 1:
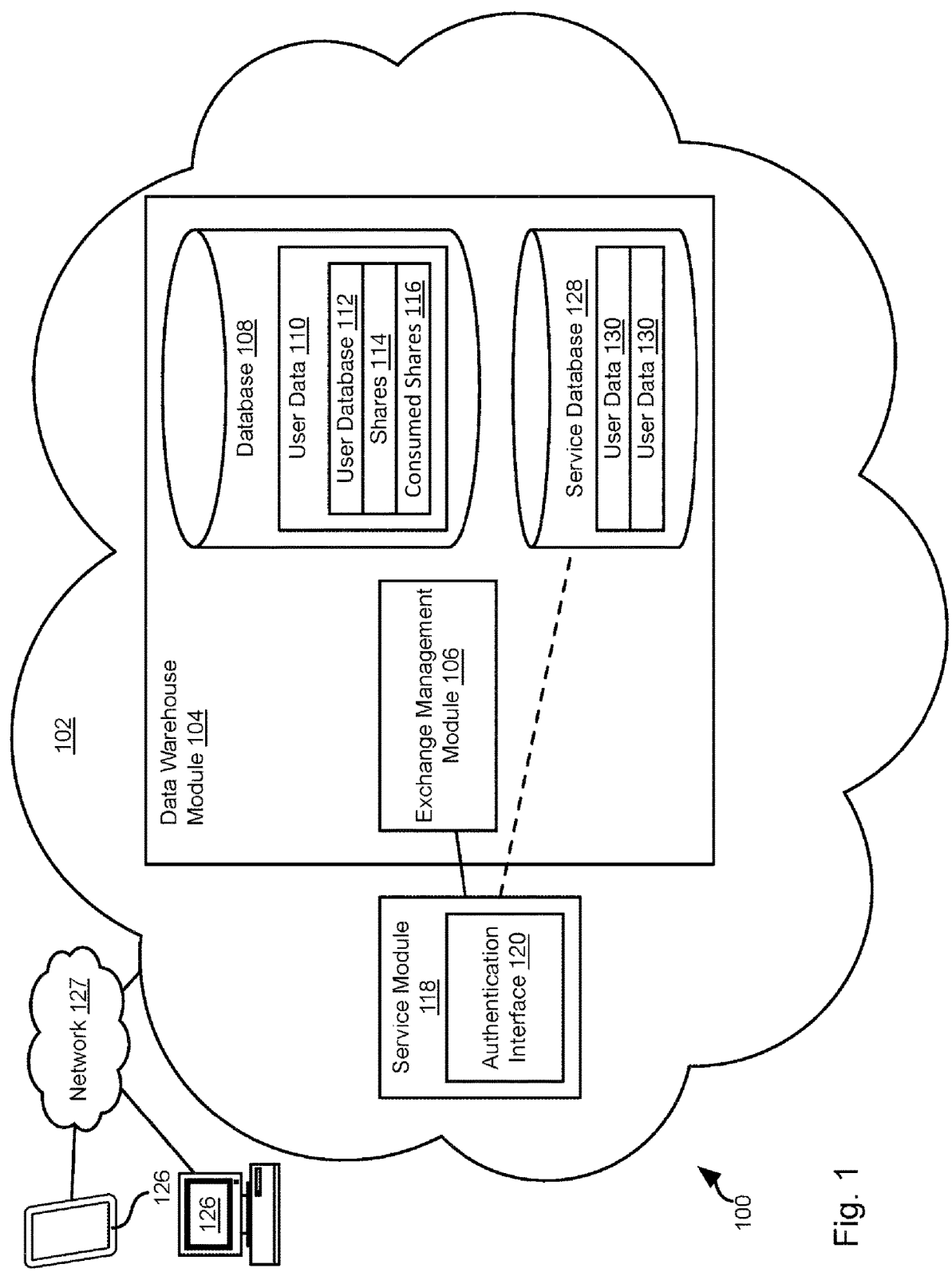
FIG. 1 is a block diagram depicting an example computing environment in which the methods disclosed herein may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example" or "an example" means that a particular feature, structure or characteristic described in connection with the embodiment or example is included in at least one embodiment of the present disclosure. Thus, appearances of the phrases "in one embodiment," "in an embodiment," "one example" or "an example" in various places throughout this specification are not necessarily all referring to the same embodiment or example. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

FIG. 1 is a block diagram of an example computing environment 100 in which the systems and methods disclosed herein may be implemented. In particular, a cloud computing platform 102 may be implemented, such as AMAZON WEB SERVICES (AWS), MICROSOFT AZURE, GOOGLE CLOUD, or the like. As known in the art, a cloud computing platform 102 provides computing resources and storage resources that may be acquired (purchased) and configured to execute applications and store data.

The cloud computing platform 102 may execute a data warehouse module 104 that provides both storage of data, e.g. data management and access, and analysis functions, e.g. SQL queries, analysis, and other computation capabilities. For example, the data warehouse module 104 may be a data warehouse implemented by SNOWFLAKE. The data warehouse module 104 may execute on the cloud computing platform 102, a different cloud computing platform, or a different server that interfaces with the cloud computing platform 102 to perform data warehouse functions on the cloud computing platform.

Note that there may be instances of data warehouse modules 104 executing on multiple cloud computing platforms 102. These instances of data warehouse modules 104 may communicate with one another in order to coordinate a data exchange according to the methods disclosed herein across the multiple cloud computing platforms.

The data warehouse module 104 may host or access an exchange management module 106 that facilitates the sharing of data among different users. For example, the data warehouse module 104 may manage the storage and access of a database 108 storing various instances of user data 110 for different users, e.g. different enterprises or individuals. The user data may include a user database 112 of data stored and accessed by that user.

The user database 112 may be subject to access control such that only the owner of the data is allowed to change and access the database 112 upon authenticating with the data warehouse module 104. For example, data in the database 112 may be encrypted such that it can only be decrypted using decryption information possessed by the owner of the data. Using the exchange management module 106, specific data from a user database 112 that is subject to these access controls may be shared with other users in a controlled manner according to the methods disclosed herein. In particular, a user may specify shares 114 that may be shared to the public in an uncontrolled manner or shared with specific other users in a controlled manner as described above. The user data 110 may also specify consumed shares 116 that are shares 114 of other users that the user has obtained access to.

Note that when a first user adds data to the consumed shares 116 of the first user, the data of the consumed shares 116 is not copied to the user data 110 of the first user. Instead, the consumed share 116 is a reference to the shared data in the user data 110 of a second user, which is then accessed as requested by the first user, subject to controls imposed by the second user. If the data referenced by a consumed share 116 is changed by the second user, the first user will be able to access this modified data (subject to any access controls) since both users use the same version of the data.

Shared data may then be used to process SQL queries, such as joins, aggregations, or other analysis. In some instances, the second user may define a share 114 such that only "secure joins" are permitted to be performed with respect to the shared data. A secure join may be performed such that analysis may be performed with respect to shared data but the actual shared data is not accessible by the first user. A secure join may be performed as described in U.S. application Ser. No. 16/368,339, filed Mar. 18, 2019, and entitled SECURE DATA JOINS IN A MULTIPLE TENANT DATABASE SYSTEM, which is hereby incorporated herein by reference in its entirety.

The cloud computing platform 102 may implement a service module 118, such as software as a service (SaaS) platform (e.g., SALESFORCE). The service module 118 may be independent of the data warehouse module 104, e.g. operated by a different entity. Accordingly, the service module 118 may be a user of the data warehouse module 104. The service module 118 may define various interfaces by which users of the service module 118 may access it. For example, an authentication interface 120 may enable users to authenticate with respect to the service module 118, such as by means of login information (username and password), certificate, token, or other authentication information.

The service module 118 may create and/or access a service database 128 that stores user data 130 that is generated and used by users according to the functionality implemented by the service module 118. Accordingly, user data 130 may be owned by a particular user such that access of the data 130 of a particular user is only permitted by the service module 118 upon authentication by way of the authentication interface 120.

In some embodiments, the service database 128 is implemented and managed by the data warehouse module 104, such that reading and writing of data to the database 128 is performed by way of an interface defined by the data warehouse module 104.

In the illustrated configuration, the service module 118 and data warehouse module 104 reside in the same cloud computing platform 102. In other embodiments, the service module 118 executes on a different cloud computing platform or on a separate server system.

User devices 126, such as laptop computers, desktop computers, mobile phones, tablet computers, or other computing devices may be used to access the data warehouse module 104 or service module 118 by way of a network 127, such as the Internet.

In the description below, actions are ascribed to users, particularly consumers and providers. Such actions shall be understood to be performed with respect to devices 126 operated by such users. For example, notification to a user may be understood to be a notification transmitted to a device 126, an input or instruction from a user may be understood to be received by way of the user's device 126, and interaction with an interface by a user shall be understood to be interaction with the interface on the user's device 126. In addition, database operations (joining, aggregating, analysis, etc.) ascribed to a user (consumer or provider) shall be understood to include performing of such actions by the data warehouse module 104 in response to an instruction from that user.

Figure 2:
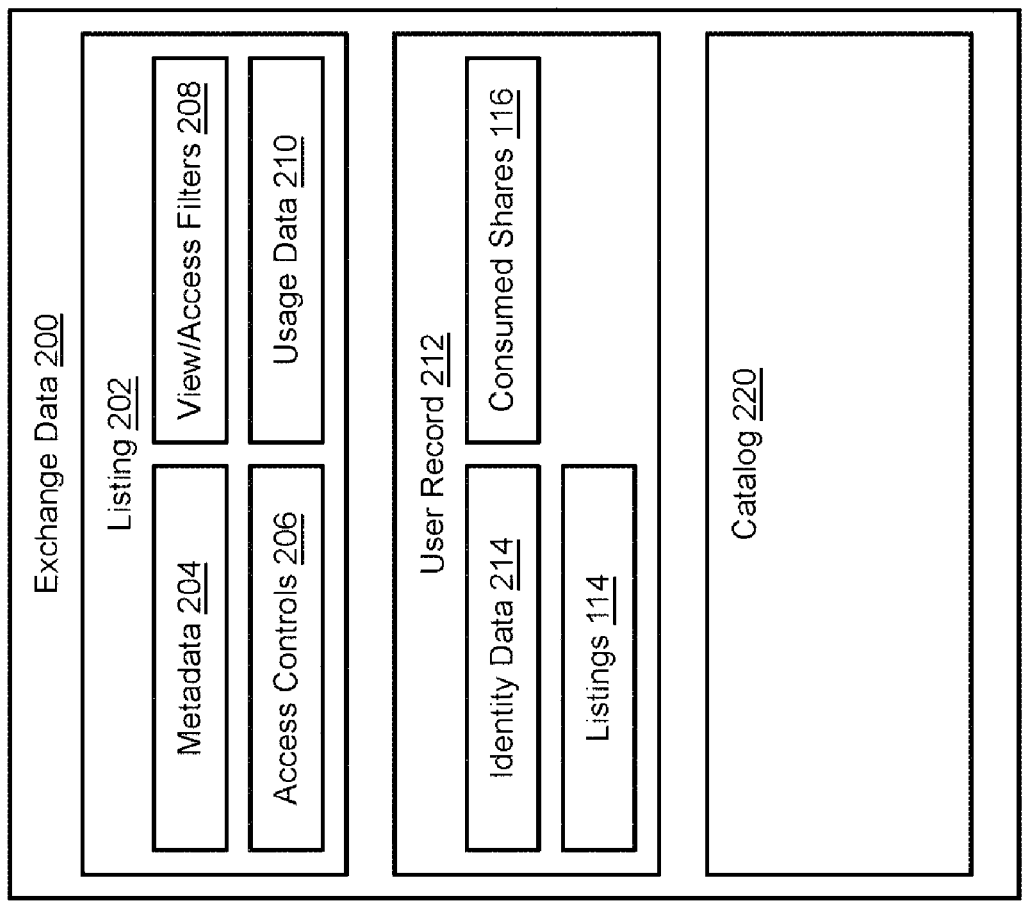
FIG. 2 is a schematic block diagram of data that may be used to implement a data exchange in accordance with an embodiment of the present invention.

Referring to FIG. 2, the exchange management module 106 may operate with respect to some or all of the illustrated exchange data 200, which may be stored on the platform executing the exchange management module 106 (e.g., the cloud computing platform 102) or at some other location.

The exchange data 200 may include a plurality of listings 202 describing data that is shared by a first user ("the provider"). A listing 202 may include metadata 204 describing the shared data. The metadata 204 may include some or all of the following information:

An identifier of the sharer of the shared data
A uniform resource locator (URL) of the sharer of the shared data
A name of the share
A name of a table (may include a schema and view of a schema for shared table)
A category to which the shared data belongs
An update frequency of the shared data
A catalog of the table
A number of columns and a number of rows
Names of columns or rows
An example table (e.g., sample of rows and columns of the table)
Example queries that could be run against the table
Example views of the table
Example graphs, visualizations, or dashboards based on data in the table
Metadata for use by business intelligence tools, such as looker blocks
A text (prose) description of the data contained in the table
A list of keywords describing the table to facilitate searching
A link (e.g., URL) to documentation relating to the shared data
A refresh interval indicating how frequently the shared data is updated
The date the data was last updated.

The listing 202 may include access controls 206. For example, access controls 206 may indicate that the shared data is available to the public without restriction (an "any share" as used elsewhere herein). The access controls 206 may specify a class of users (members of a particular group or organization) that are allowed to access the data. The access controls 206 may specify that a "point-to-point" share (see discussion of FIG. 4) in which users may request access but are only allowed access upon approval of the provider. The access controls 206 may specify a set of user identifiers of users that are excluded from being able to access the data referenced by the listing 202.

Figure 6:
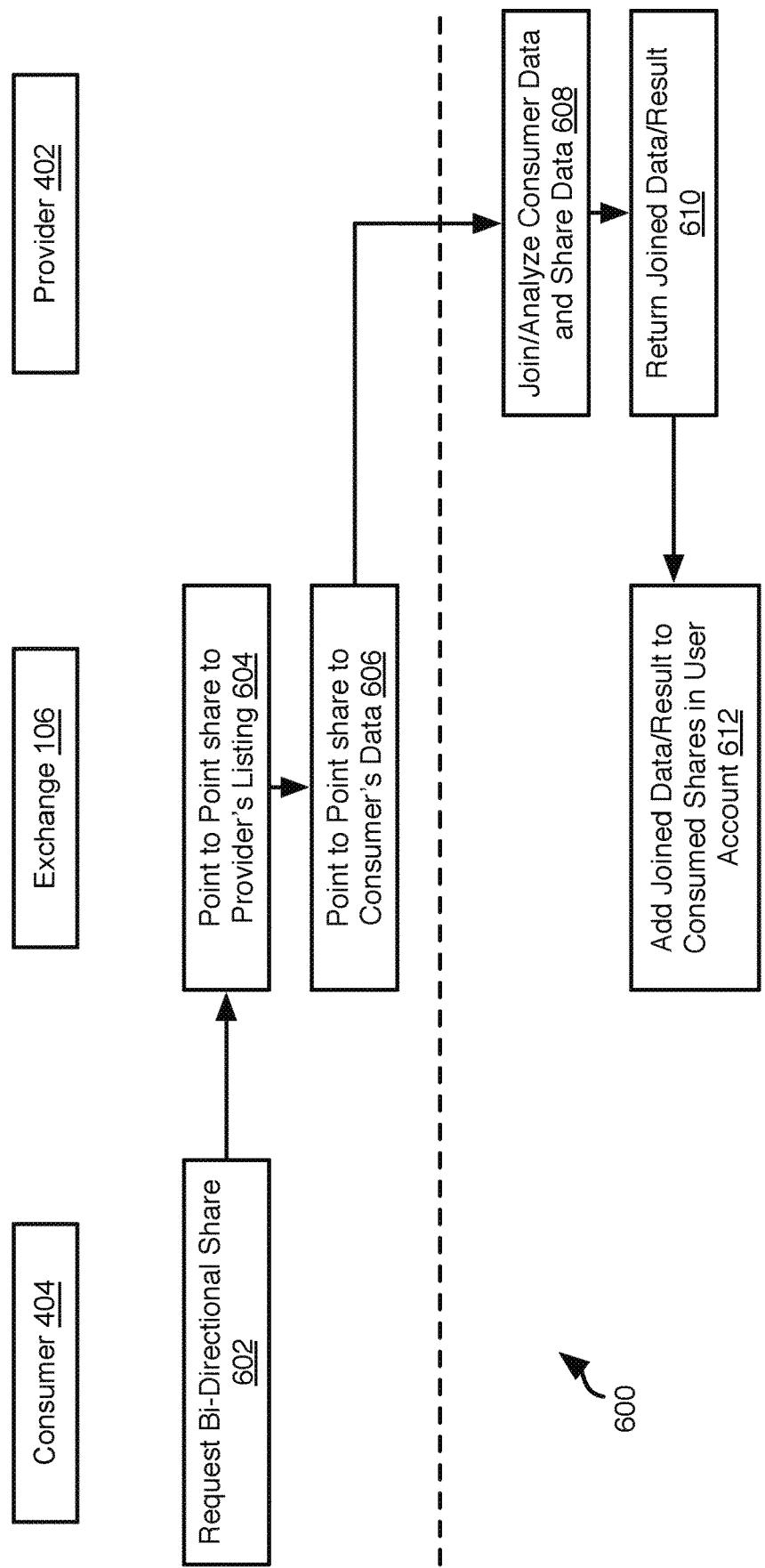
FIG. 6 is a process flow diagram of a method for performing bi-directional shares in a data exchange in accordance with an embodiment of the present invention.

Note that some listings 202 may be discoverable by users without authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this not permitted. For example, access controls 206 may specify that only secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the data warehouse module 104) is added to the access controls 206 such that the user will subsequently be able to access the data referenced by the listing 202 without further authentication.

The listing 202 may define one or more filters 208. For example, the filters 208 may define specific identity data 214 of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange management module 106 using the same components. In some embodiments, an excluded user that is excluded from accessing a listing 202, i.e. adding the listing 202 to the consumed shares 116 of the excluded user, may still be permitted to view a representation of the listing when browsing the catalog 220 and may further be permitted to request access to the listing 202 as discussed below.

Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 116 of the user is permitted to access the data referenced by the listing but only a filtered version that only includes data associated with the identity data 214 of that user, associated with that user's organization, or specific to some other classification of the user. In some embodiments, a private exchange is by invitation: users invited by a provider to view listings 202 of a private exchange are enabled to do by the exchange management module upon communicating acceptance of an invitation received from the provider.

In some embodiments, a listing 202 may be addressed to a single user. Accordingly, a reference to the listing 202 may be added to a set of "pending shares" that is viewable by the user. The listing 202 is added to the consumed shares 116 of the user upon the user communicating approval to the exchange management module 106.

The listing 202 may further include usage data 210. For example, the data warehouse module 104 may implement a credit system in which credits are purchased by a user and are consumed each time a user runs a query, stores data, or uses other services implemented by the data warehouse module 104. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange management module 106 to the consumed shares 116 of the user.

The exchange data 200 may further include user records 212. The user record 212 may include data identifying the user associated with the user record 212, e.g. an identifier (e.g., warehouse identifier) of a user having user data 110 managed by the data warehouse module 104.

The user record 212 may list shares 114 of the user, e.g., reference listings 114 created by the user. The user record 212 may list shares 116 consumed by the user, e.g. reference listings 202 created by another user and that have been associated to the account of the user according to the methods described herein. For example, a listing 202 may have an identifier that will be used to reference it in the shares 114 or consumed shares 116 of a user record 212.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there a multiple instances of the data warehouse module 104 on different cloud computing platforms, the catalog 220 of one instance of the data warehouse module 104 may store listings or references to listings from other instances on one or more other cloud computing platforms 102. Accordingly, each listing 202 may be globally unique (e.g., be assigned a globally unique identifier across all of the instances of the data warehouse module 104). For example, the instances of the data warehouse modules 104 may synchronize their copies of the catalog 220 such that each copy indicates the listings 102 available from all instances of the data warehouse module 104. In some instances, a provider of a listing 202 may specify that it is to be available on only on specified one or more computing platforms 102.

In some embodiments, the catalog 220 is made available on the Internet such that it is searchable by a search engine such as BING or GOOGLE. The catalog may be subject to a search engine optimization (SEO) algorithm to promote its visibility. Potential consumers may therefore browse the catalog 220 from any web browser. The exchange management module 106 may expose uniform resource locators (URLs) linked to each listing 202. This URL may be searchable and can be shared outside of any interface implemented by the exchange management module 106. For example, the provider of a listing 202 may publish the URLs for its listings 202 in order to promote usage of its listing 202 and its brand.

Figure 3:
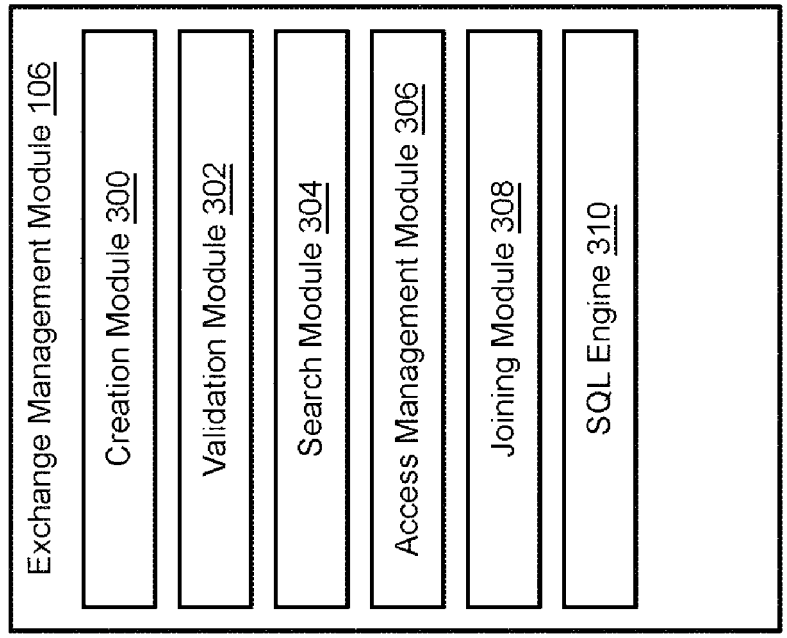
FIG. 3 is a schematic block diagram of components for implementing a data exchange in accordance with an embodiment of the present invention.

FIG. 3 illustrates various components 300-310 that may be included in the exchange management module 106. A creation module 300 may provide an interface for creating listings 202. For example, a webpage interface to the data warehouse module 104 that enables a user on a device 126 to select data, e.g. a specific table in user data 110 of the user, for sharing and enter values defining some or all of the metadata 204, access controls 206, and filters 208. In some embodiments, creation may be performed by a user by way of SQL commands in an SQL interpreter executing on the cloud computing platform 102 and accessed by way of a webpage interface on a user device 126.

A validation module 302 may validate information provided by a provider when attempting to create a listing 202. Note that in some embodiments the actions ascribed to the validation module 302 may be performed by a human reviewing the information provided by the provider. In other embodiments, these actions are performed automatically. The validation module 302 may perform, or facilitate performing by a human operator, some or all of:

Verifying that the metadata 204 is consistent, e.g. that the shared data referenced and any other information describing the shared data are consistent.

Verifying that the shared data referenced by the metadata 204 is not pirated data, personal identification information (PII), personal health information (PHI), or other data for which sharing is undesirable or illegal.

Verifying that the data is fresh and is updated within a reasonable period of time (e.g., at least daily)

Verifying that the data is not a static (i.e., is not available from other static public sources).

Verify that the data is more than just a sample, i.e. is sufficiently complete to be useful. For example, geographically limited data may be undesirable whereas an aggregation of data that is not otherwise limited may still be of use.

The exchange management module 106 may include a search module 304. The search module 304 may implement a webpage interface that is accessible by a user on a user device 126 in order to invoke searches for search strings with respect to the metadata in the catalog 220, receive responses to searches, and select references to listings 202 in search results for adding to the consumed shares 116 of the user record 212 of the user performing the search. In some embodiments, searches may be performed by a user by way of SQL commands in an SQL interpreter executing on the cloud computing platform 102 and accessed by way of a webpage interface on a user device 126. For example, searching for shares may be performed by way of SQL queries against the catalog 220 within the SQL engine 310 discussed below.

The search module 304 may further implement a recommendation algorithm. For example, the recommendation algorithm could recommend other listing 202 for a user based on other listings in the user's consumed shares 116 or formerly in the user's consumed shares. Recommendations could be based on logical similarity: one source of weather data leads to a recommendation for a second source of weather data. Recommendations could be based on dissimilarity: one listing is for data in one domain (geographic area, technical field, etc.) results in a listing for a different domain to facilitate complete coverage by the user's analysis (different geographic area, related technical field, etc.).

The exchange management module 106 may include an access management module 306. As described above, a user may add a listing 202. This may require authentication with respect to the provider of the listing 202. Once a listing 202 is added to the consumed shares 116 of the user record 212 of a user, the user may be either (a) required to authenticate each time the data referenced by the listing 202 is accessed or (b) be automatically authenticated and allowed to access the data once the listing 202 is added. The access management module 306 may manage automatic authentication for subsequent access of data in the consumed shares 116 of a user in order to provide seamless access of the shared data as if it was part of the user data 110 of that user. To that end, the access management module 306 may access access controls 206 of the listing 202, certificates, tokens, or other authentication material in order to authenticate the user when performing accesses to shared data.

The exchange management module 106 may include a joining module 308. The joining module 308 manages the integration of shared data referenced by consumed shares 116 of a user with one another, i.e. shared data from different providers, and with a user database 112 of data owned by the user. In particular, the joining module 308 may manage the execution of queries and other computation functions with respect to these various sources of data such that their access is transparent to the user. The joining module 308 may further manage the access of data to enforce restrictions on shared data, e.g. such that analysis may be performed and the results of the analysis displayed without exposing the underlying data to the consumer of the data where this restriction is indicated by the access controls 206 of a listing 202.

The exchange management module 106 may further include a standard query language (SQL) engine 310 that is programmed to receive queries from a user and execute the query with respect to data referenced by the query, which may include consumed shares 116 of the user and the user database 112 owned by the user. The SQL engine 310 may perform any query processing functionality known in the art. The SQL engine 310 may additionally or alternatively include any other database management tool or data analysis tool known in the art. The SQL engine 310 may define a webpage interface executing on the cloud computing platform 102 through which SQL queries are input and responses to SQL queries are presented Referring to FIG. 4A, the illustrated method 400 may be executed by the exchange management module 106 in order to implement a point-to-point share between a first user ("provider 402") and a second user ("consumer 404").

The method 400 may include the provider entering 406 metadata. This may include a user on a device 126 of the provider entering the metadata into fields of a form in a webpage provided by the exchange management module 106. In some embodiments, entering 406 of metadata may be made using SQL commands by way of the SQL engine 310. The items of metadata may include some or all of those discussed above with respect to the metadata 204 of a listing 202. Step 406 may include receiving other data for a listing 202, such as access controls 206 and parameters defining a filter 208.

The provider 402 may then invoke, on the device 126, submission of the form and the data entered.

The exchange management module 106 may then verify 408 the metadata and validate 410 the data referenced by the metadata. This may include performing some or all of the actions ascribed to the validation module 302.

If the metadata and shared data are not successfully verified 408 and validated 410, the exchange management module 106 may notify the provider 402, such as by means of a notification through the web interface through which the metadata was submitted at step 406.

If the metadata and shared data are not successfully verified 408 and validated 410, the exchange management module 106 may notify the provider 402, such as by way of the web interface through which the metadata was submitted at step 406.

The exchange management module 106 may further create 412 a listing 202 including the data submitted at step 406 and may further create an entry in the catalog 220. For example, keywords, descriptive text, and other items of information in the metadata may be indexed to facilitate searching.

Note that steps 406-412 may be performed by means of interface provided to the provider 402. Such an interface may include such things as:
Interface elements for inputting the data (some or all of elements 204-210) a listing 202 and invoking addition of the listing 202 to the catalog 220.
An interface element to invoke unpublishing of the listing 202 (e.g. making non-viewable to other users).
Edit metadata 204 of a listing and change to a newer version or rollback to a prior version of the metadata 204.
An interface element to view a rendering of a listing 202 as it will be represented to consumers 404.
A listing of pending requests to add a listing 202 along with interface elements to invoke approval of a request to add the listing 202, deny a request to add the listing 202
An interface element to invoke revocation of permission to add a listing 202 to a consumer 404 that has previously been approved to add a listing or remove all access to a listing 202 to all consumers 404.
A representation of a number and identity of consumers 404 that have added a listing 202 of the provider 402.
A representation of usage patterns of the data referenced by a listing 202 by all consumers 404 or specific consumers 404 of that listing 202.

Another user acting as a consumer 404 may then browse 414 the catalog. This may include accessing a publicly accessible webpage providing a search interface to the catalog. This webpage may be external to the data warehouse module 104, i.e. accessible by users that are not logged into the data warehouse module 104. In other embodiments, only users that are logged in to the data warehouse module 104 are able to access the search interface. As noted above, browsing of the catalog 220 may be performed using queries to the SQL engine 310 that reference the catalog 220. For example, a user device 126 may have a web-based interface to the SQL engine 310 through which queries against the catalog 220 are input by the consumer 404 and transmitted to the SQL engine 310.

In response to the consumer's browsing activities, the exchange management module 106 may display the catalog and perform 416 searches with respect to the catalog to identify listings 202 having metadata corresponding to queries or search strings submitted by the consumer 404. The manner in which this search is performed may be according to any search algorithm known in the art. In the case of an SQL query, the query may be processed according to any approach for processing SQL queries known in the art.

The exchange management module 106 may return results of a search string or SQL query to the consumer's 404 device 126, such as in the form of a listing of references to listings 202 identified according to the search algorithm or processing the SQL query. The listing may include items of metadata or links that the consumer 404 may select to invoke display of metadata. In particular, any of the items of metadata 204 of a listing 202 may be displayed in the listing or linked to by an entry in the listing corresponding to the search record 202.

Figure 4A:
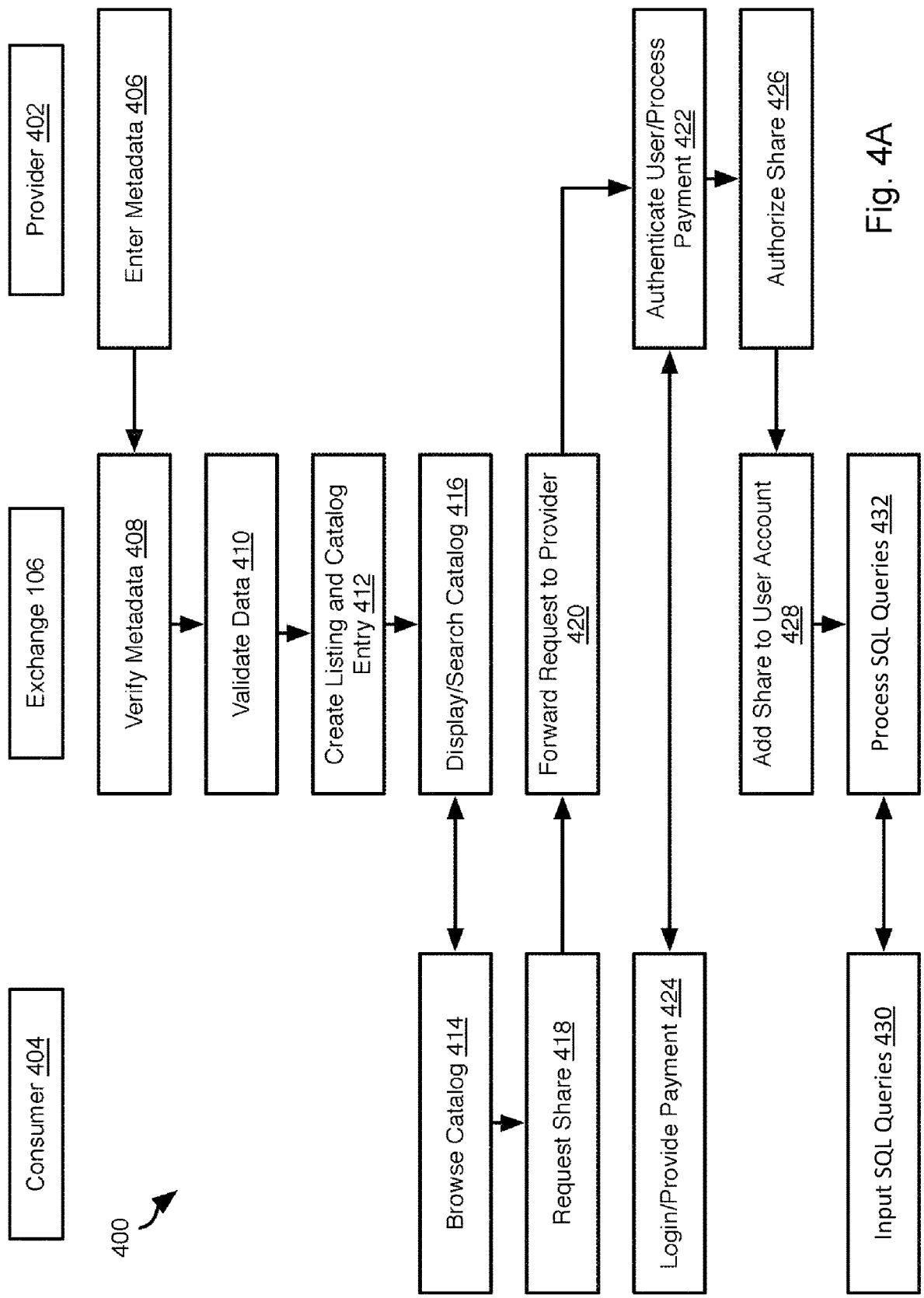
FIG. 4A is a process flow diagram of a method for controlled sharing of data among entities in a data exchange in accordance with an embodiment of the present invention.

Note that the exchange referenced in FIG. 4A may be a private exchange or a public exchange. In particular, those listings 202 that are displayed and searched 416 and viewable by the consumer 404 during browsing 414 may be limited to those having filters 208 that indicate that the listing 202 is viewable by the consumer 404, an organization of the consumer, or some other classification to which the consumer 404 belongs. Where the exchange is public, then the consumer 404 is not required to meet any filter criteria in some embodiments.

The method 400 may include the consumer 404 requesting 418 to access data corresponding to a listing 202. For example, by selecting an entry in the listing on the device 126 of the consumer 404, which invokes transmission of a request to the exchange management module 106 to add the listing 202 corresponding to the entry to the consumed shares 116 in the user record 212 of the consumer 404.

In the illustrated example, the listing 202 of the selected entry has access controls 206. Accordingly, the exchange management module 106 may forward 420 the request to the provider 402 along with an identifier of the consumer 404. The consumer 404 and provider 402 may then interact to one or both of (a) authenticate (login) 424 the consumer 404 with respect to the provider 402 and (b) process 424 payment for access of the data referenced by the listing 202. This interaction may be according to any approach to logging in or authenticating or known in the art. Likewise, any approach for processing payment between parties may be implemented. In some embodiments, the data warehouse module may provide a rebate to the provider 402 due to credits consumed by the consumer 404 when accessing the shared data of the provider. Credits may be units of usage purchased by a user that are then consumed in response to services of the data warehouse module 104 used by the consumer 404, e.g. queries and other analytics performed on data hosted by the data warehouse module 104. The interaction may be directly between devices 126 of the consumer 404 and provider 402 or may be performed by way of the exchange management module 106. In some embodiments, the exchange management module 106 authenticates the consumer 404 using the access control information 206 such that interaction with the provider 402 is not needed. Likewise, the listing 202 may define payment terms such that the exchange management module 106 processes payment without requiring interaction with the provider 402. Once the provider 402 determines that the consumer 404 is authenticated and authorized to access the data referenced by the listing 202, the provider 402 may notify 426 the exchange management module 106 that the consumer 404 may access the data referenced by the listing 202. In response, the exchange management module adds 428 a reference to the listing 202 to the consumed shares 116 in the user record 212 of the consumer 404.

Note that in some instances a listing 202 does not list specific data, but rather references a particular service module 118, e.g. the brand name or company name of a service. Accordingly, the request to access the listing 202 is a request to access user data 130 of the consumer making the request. Accordingly, steps 422, 424, 426 including authenticating the consumer 404 with respect to the authentication interface 120 such that the service module 118 can verify the identity of the consumer 404 and inform the exchange management module 106 of which data to share with the consumer 404 and to indicate that the consumer 404 is authorized to access that data.

In some embodiments, this may be implemented using a "single sign on" approach in which the consumer 404 authenticates (logs in) once with respect to the service module 118 and thereafter is enabled to access the consumers 404 data in the service database 128. For example, the exchange management module 106 may present an interface to the service module 118 on the device 126 of the consumer 404. The consumer 404 inputs authentication information (username and password, certificate, token, etc.) into the interface and this information is forwarded to the authentication interface 120 of the service module 118. The authentication information processes the authentication information and, if the information corresponds to a user account, notifies the exchange management module 106 that the consumer 404 is authenticated with respect to that user account. The exchange management module 106 may then identify the user data 130 for that user account and create a database referencing it. A reference to that database is then added to the consumed shares 116 of the consumer 404.

In some embodiments, the user's authentication with respect to the data warehouse module 104 is sufficient to authenticate the user with respect to the service module 118 such that steps 422, 424 are omitted in view of the prior authentication of the consumer 404. For example, the data warehouse module 104 may be indicated by the consumer 404 to the service module 118 to be authorized to verify the identity of the consumer 404.

In some embodiments, the exchange management module 106 authenticates the consumer 404 using the access control information 206 such that interaction with the provider 402 is not needed. Likewise, the listing 202 may define payment terms such that the exchange management module 106 processes payment without requiring interaction with the provider 402. Accordingly, in such embodiments, step 422 is performed by the exchange management module 106 and step 426 is omitted. The exchange management module 106 then performs step 428 once the consumer 404 is authenticated and/or provided required payment.

In some embodiments, adding a listing 202 to the consumed shares of a consumer 404 may further include receiving, from the consumer 404, consent to terms presented to the consumer 404. In some embodiments, where the terms of the agreement are changed by a provider 402 after a consumer 404 has added the listing 202 according to the method 400 or other method described herein, the exchange management module 106 may require the consumer 404 to agree to the changed terms before being allowed to continue to access the data referenced by the listing 202.

Adding 428 the data reference by the listing 202 may include creating a database referencing the data. A reference to this database may then be added to the consumed shares 116 and this database may then be used to process queries referencing the data referenced by the share record. Adding 428 the data may include adding data filtered according to filters 208. For example, data referenced by the listing 202 (e.g., a filtered view of the data) and that is associated with the consumer 404, organization of the consumer 404, or some other classification of the consumer 404.

In some embodiments, adding the listing 202 to the user record 212 may include changing the access controls 206 of the listing 202 to reference the identity data 214 of the consumer 404 such that attempts to access the data referenced by the listing 202 will be permitted and executed by the exchange management module 106.

The consumer 404 may then input 430 queries to the SQL engine 310 by way of the consumer's device 126. The queries may reference the data referenced in the listing 202 added at step 428 as well as other data referenced in the user database 112 and consumed shares 116. The SQL engine 310 then processes 432 the queries using the database created at step 428 and returns the result to the consumer 404 or creates views, materialized views, or other data that may be accessed or analyzed by the user. As noted above, the data of consumed shares operated upon by the queries may have been previously filtered to include only data relating to the consumer 404. Accordingly, different consumers 404 adding the same listing 202 to their consumed shares 116 will see different versions of the database referenced by the listing 202.

Referring to FIG. 4B, in some embodiments, the private sharing of data and filtering of data according to identity of the consumer 404 may be implemented using the illustrated data structures. For example, the service database 128 of the provider 402 may include a customer map 434 that includes entries for customer identifiers 436 of users of the service provided by the provider 402, e.g. a service implemented by the service module 118 of the server and the customer identifier 436 being an identifier for authenticating with the authentication interface 120. The customer map 434 may map each customer identifier 436 to a warehouse identifier 438, i.e. a user identifier used by a user to authenticate with the warehouse module 104 such that the same user corresponds to both identifiers 436, 438. The mapping between the identifiers 436 and 438 may be performed by authenticating as described above (e.g., the single sign on approach described above).

The customer map 434 may further include a reference 440 to an entitlement table 442, which may be one of a plurality of entitlement tables 442. Each entitlement table 442 defines which of one or more tables 444 of the provider 402 may be accessed with the customer ID 436 to which it is mapped. The entitlement table 442 may further define columns of a table 444 that can be accessed with the customer ID 436. The entitlement table 442 may further define rows of a table 444 that can be accessed with the customer ID 436. The entitlement table 442 may further define a schema for a table 444 that can be accessed with the customer ID 436.

A listing 202 for a table 444 may therefore specify that access to a data table 444 is to be performed as defined by the customer map 434. For example, referring to FIG. 4C, when a consumer 404 requests to add a listing 202 for a database for which access is defined according to the customer map, the exchange management module 106 may create a secure view 446 according to the customer identifier 436 and entitlement table 442 mapped to the warehouse identifier 438 of the consumer 404. The secure view may be generated by performing a secure join of the data tables 444 of the database specified in the entitlement table 442 (or portions thereof as specified in the entitlement table 442) that is filtered according to the customer identifier 436 such that a result of the join includes only data for the specific customer identifier 436 and includes only those portions of the database (tables 444 and/or portions of tables 444) specified in the entitlement table 442. The manner in which the secure view is generated may be as described in U.S. application Ser. No. 16/055,824 filed Aug. 6, 2018, and entitled SECURE DATA SHARING IN A MULTI-TENANT DATABASE and U.S. application Ser. No. 16/241,463 filed Jan. 7, 2019 and entitled SECURE DATA SHARING IN A MULTI-TENANT DATABASE, both of which are hereby incorporated herein by reference in their entirety.

Figure 5:
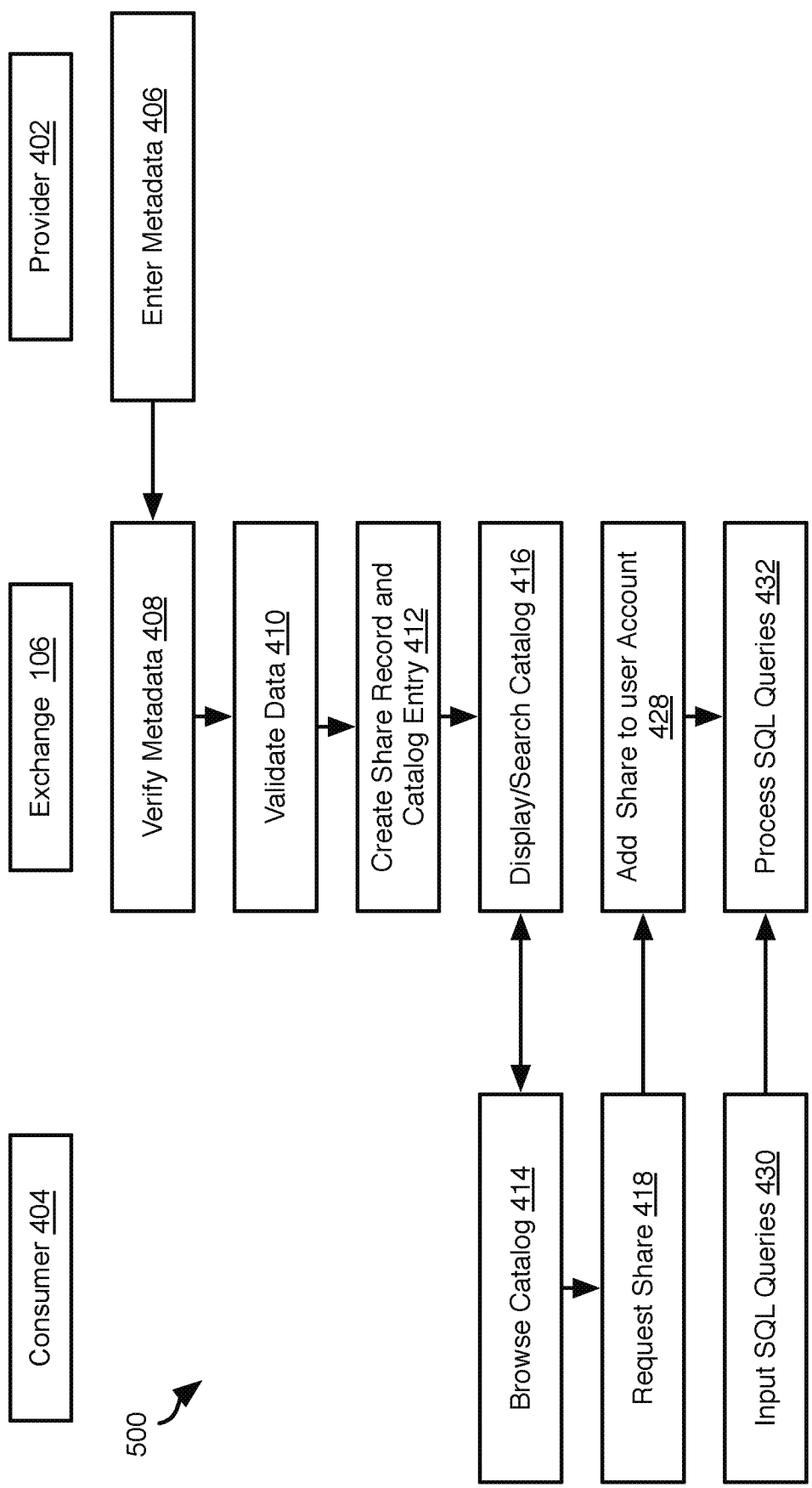
FIG. 5 is a process flow diagram of a method for public sharing of data among entities in a data exchange in accordance with an embodiment of the present invention.

FIG. 5 illustrates an alternative method 500 for sharing data that may be performed when the consumer requests 418 to add a listing 202 that is available to the public. In that case, the exchange management module 106 adds 428 the reference to the listing 202 to the consumed shares 116 of the consumer 404 and authentication or payment steps are omitted. Step 428 may be performed as described above except that no change to access controls 206 is performed. Likewise, steps 430 and 432 may be performed with respect to the shared data as described above. The exchange of FIG. 5 could be a public exchange or a private exchange as described above with respect to FIG. 4. FIG. 5 illustrates the case where if a listing 202 is viewable (i.e. filter criteria permit viewing by the consumer 404 as described above), the consumer 404 is able to add the listing 202 to the consumed shares 116 of the consumer 404 without further authentication or payment.

Note that when a listing 202 is added to the consumed shares 116 of a user according to any of the methods disclosed herein, the exchange management module 106 may notify consumers of the listing 202 when the data referenced by the listing 202 is updated.

Referring to FIG. 6, in some embodiments, a method 600 may include a consumer 404 browsing a catalog and selecting a listing 202 as described for the other methods described herein (see, e.g., FIGS. 4A and 5), from the exchange management module 106, a bidirectional share with respect to the data referenced by the listing ("the shared data") and additional data in the user database 112 ("the user's data"). Note that in some embodiments the listing 202 of the provider 402 does not reference any specific data (e.g., a specific table or database) and instead offers to perform a service with respect to data provided by the consumer 404. Accordingly, in such instances "the shared data" as discussed below may be understood to be replaced with "the offered service."

In response to this request, the exchange management module 106 implements 604 a point-to-point share of the shared data with respect to the consumer 404 and the provider 402. This may be performed as described above with respect to FIG. 4A, e.g. include authentication of the consumer 404 and possibly filtering of the shared data to only include data associated with the consumer 404 as described above. The exchange management module 106 may further implement a point-to-point share of the user's data with respect to the provider 402 as described with respect to FIG. 4A except: (a) the consumer 404 acts as the provider and the provider 402 acts as the consumer for the user's data and the user's data is added to the consumed shares 116 of the provider 402 and (b) the consumer 404 need not create a listing 202 for the user's data and the user's data need not be listed in the catalog 220.

Following step 606, both the consumer 404 or the provider 402 have access to the shared data and the user's data. Either may then run queries against both of these, join them, perform aggregations on the joined data, or perform any other actions known in the art with respect to multiple databases.

In some embodiments, a bi-directional share may include, or be requested by the consumer 404 to include, the provider 402 also joining 608 the shared data and the user data to obtain joined data and returning 610 a reference to the joined data to the exchange management module 106 with a request to add 612 a reference to the joined data to the consumed shares 116 of the consumer 404, which the exchange management module 106 does.

Accordingly, the consumer 404 will now have access to the joined data. Step 608 may further include performing other actions (aggregations, analysis) on the user data and shared data either before or after joining. Step 608 may be performed by the data warehouse module 104 in response to the request form the consumer 404 to do so.

Note that the result of the join may be either (a) a new database that is a result of the join or (b) a joined database view that defines a join of the shared data and the user data.

The result from step 608 (joining, aggregating, analyzing, etc.) may alternatively be added to the original share performed at step 606, 608, e.g. a view (materialized or non-materialized) defining the operations performed at step 608.

Steps 608-612 may also be performed by the data warehouse module 104 in response to a request from the consumer 404 or provider 402 to do so independently from the request made at step 602.

Note that in many instances there are many consumers 404 that attempt to perform bi-directional shares with respect to the provider 402 and these consumers 404 may seek bi-directional shares with respect to their user data that may be in many different formats (schemas) that may be different from a schema used by the shared data of the provider 402. Accordingly, step 608 may include a transformation step. The transformation step maps a source scheme of the user's data to a target schema of the shared data. The transformation may be a static transformation provided by a human operator. The transformation may be according to an algorithm that maps column labels of the source schema to corresponding column labels of the target schema. The algorithm may include a machine learning or artificial intelligence model that is trained to perform the transformation. For example, a plurality of training data entries may be specified by human annotators that each include as an input a source schema and as an output include a mapping between the source schema and the target schema. These entries may then be used to train a machine learning or artificial intelligence algorithm to output a mapping to a target schema for a given input source schema.

Data added to the shares consumed by the consumer 404 and provider 402 may then be operated on by the consumer 404 and provider 402, respectively, such as by executing queries against the data, aggregating the data, analyzing the data, or performing any other actions described herein as being performed with respect to shares added to the consumed shares 116 of a user.

Figure 7:
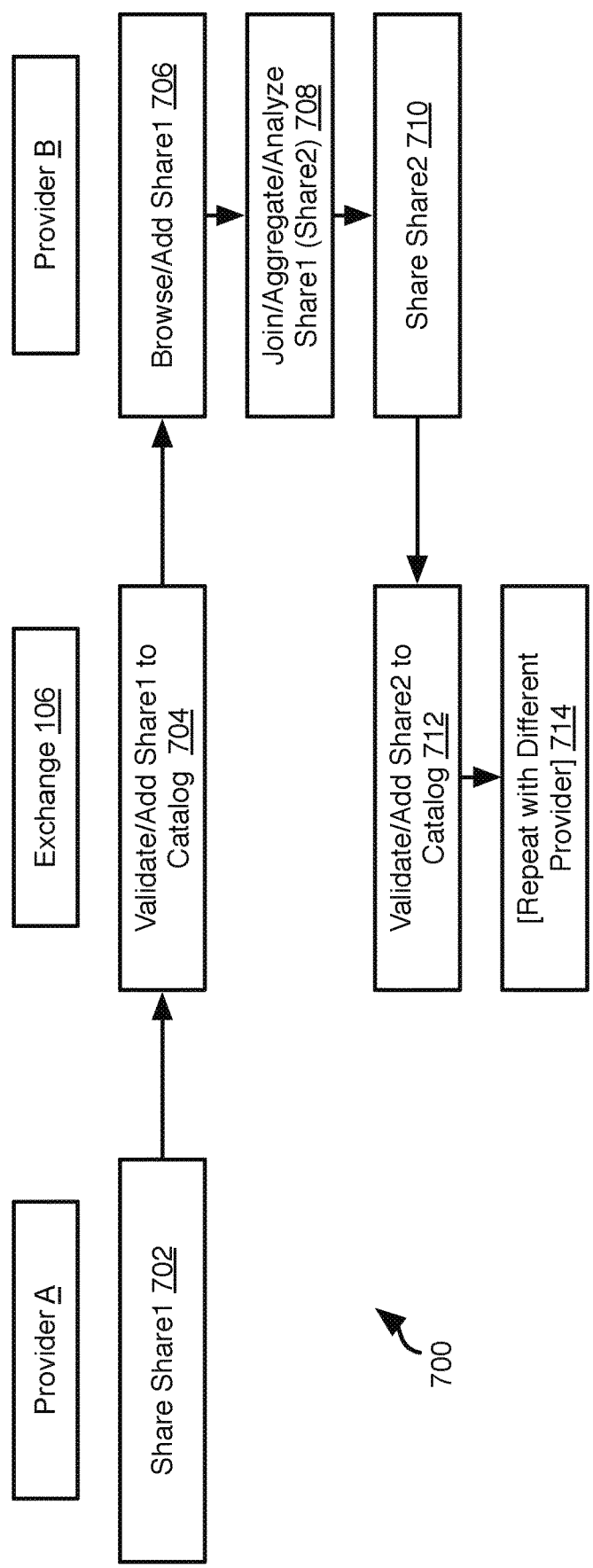
FIG. 7 is a process flow diagram of a method for providing enriched data in a data exchange in accordance with an embodiment of the present invention.

Referring to FIG. 7, the approach to sharing and consuming data as described herein enables enrichment of data and return of that enriched data to the exchange. For example, provider A may request 702 sharing of data (share 1) with the exchange in the same manner as for other methods described herein. The exchange management module 106 verifies, validates, and adds 704 share 1 to the catalog 220.

A second provider B may then browse the catalog 220 and add 706 share 1 to its consumed shares 116. Provider B may perform 708 operations on the shared data such as joining it with other data, performing aggregations, and/or performing other analysis with respect to share 1, resulting in modified data (share 2). Provider B may then request 710 sharing of share 2 with the exchange as described herein. Note that the joining of step 708 may include joining any number of databases, such as any number of shares based on any number of listings by any number of other users. Accordingly, iterations of steps 702-710 by many users may be viewed as a hierarchy in which a large number of listings 202 of multiple users are narrowed down to a smaller number of listings 202 based on the data from the larger number of listings 202.

The exchange management module 106 verifies, validates, and adds 712 share 2 to the catalog 220. This process may be repeated 714 with respect to share 2, as provider A, provider B, or a different provider adds share 2, generates modified data based on it, and adds the result back to the catalog in the same manner. In this manner, a rich ecosystem of data and analysis may be made available to users. The shares according to the method 700 may be any shares, point-to-point shares, private exchange shares, or bi-directional exchange shares according to the methods disclosed herein.

Note that there is a possibility that provider may perform steps 708 and 710 with respect to a listing 202 that is based on a listing 202. For example, listing L1 of provider A is used by provider B to create listing L2, which is used by provider C to create listing L3, which is used by provider A to define listing L1. Such a loop could include any number of steps. This may be undesirable in some cases such that modification of listing L1 to reference L3 is not permitted in view L3 being derived from L1. In other instances, such a loop is permitted provided there is a time delay in when the data referenced by each listing is refreshed. For example, L1 may reference L3 provided L3 will not be refreshed until some time after L1 is refreshed and therefore the circular reference will not result in continuous updating of L1 and L3 ad infinitum.

The listing created at step 712 (Share 2) may either (a) include copies of the data from Share 1 remaining after step 708 and as modified according to step 708 or (b) include a view referencing Share 1 (e.g., a database created based on the listing 202 for Share 1 according to the methods disclosed herein) and defining the operations performed at step 708 without including actual data from Share 1 or derived from Share 1. Accordingly, a hierarchy as described above may be a hierarchy of views that either reference one or both of listing 202 that are views created according to the method 700 or listing 202 of data from one or more providers according to any of the methods disclosed herein.

In the methods disclosed herein approaches are disclosed for creating shares (listings 202) and for adding shares. In a like manner, a consumer 404 may instruct the exchange management module 106 to remove added shares. A provider 402 may instruct the exchange management module 106 to cease sharing certain listings 202. In some embodiments, this may be accompanied by actions to avoid disrupting consumers 404 of those listings 202. Such as by notifying these consumers 404 and ceasing to share the listings 202 only after a specified time period after the notification or after all consumers 404 have removed references to the listings 202 from their consumed shares 116.

Use Cases

In a first use case a company implements a private exchange according to the methods described above. In particular, listing 202 of the company are viewable only by consumers 404 that are associated (employees, management, investors, etc.) with the company. Likewise, adding of listing 202 is permitted only for those associated with the company. When adding a listing 202 to the consumed shares 116, it may be filtered based on the identity of the consumer that adds it, i.e. data that is relevant to the consumer's role within the company.

In a second use case, a provider 402 creates a reader or reader/writer account for a consumer 404 that is not yet a user of the data warehouse module 104. The account may be associated with the account data of the consumer (see consumer map of FIG. 4B discussed above). The consumer 404 may then log on to that account and then access the provider's listings to access the consumer's data 404 that is managed by the provider 402 (see, e.g. discussion of FIG. 4A).

In a fifth use case a consumer 404 adds shares that are private (e.g., accessible due to the identity of the consumer 404 according to the methods described above) and shares that are public. These may then be joined by the consumer 404 and used to process queries.

In a sixth use case, a listing 202 may be shared based on a subscription (e.g., monthly) or be accessed based on per-query pricing, or a credit uplift multiplier. Accordingly, the exchange management module 106 may manage processing of payment and access such that the consumer 404 is allowed to access the data subject to the pricing model (subscription, per query, etc.).

In a seventh use case, the exchange management module implements secure functions and secure machine learning models (both training and scoring) that may be used to process private data such that the consumer 404 is allowed to use the result of the function or machine learning model but does not have access to the raw data processed by the function or machine learning model. Likewise, the consumer of the shared data is not allowed to export the shared data. The consumer is nonetheless allowed to perform sophisticated analytical functions with respect to the shared data. For example, the following secure function may be implemented to enable viewing of customer shopping data in a secure manner:

```
select 6139 as input_item, ss_item_sk as_, count(distinct
  ss_ticket_number) baskets from udf_demo.public.sales
  where ss_ticket_number in (select ss_ticket_number from
  udf_demo.public.sales where ss_item_sk=6139) group by
  ss_item_sk order by 3 desc, 2;
```

Secure functions may also include analytical functions performed with respect to shared data. For example, secure Function 1, Function 2, and Function 3 outlined below may be performed with respect to shared data.

Function 1:

```
create or replace secure function
  UDF_DEMO.PUBLIC.get_market_basket(input_item_sk
  number(38)) returns table (input_ item NUMBER(38,0),
  basket_item_sk NUMBER(38,0), num_baskets NUMBER(38,0))
as
'select input_item_sk, ss_item_sk basket_Item,
  count (distinct ss_ticket_number) baskets from
  udf_demo.public.sales where ss_ticket_number in (select
  ss_ticket_number from udf_demo.public.sales where
  ss_item_sk = input_item_sk) group by ss_item_sk order by 3
  desc, 2';
```

Function 2:

```
use database UDF_DEMO;
create share if not exists UDF_DEMO_SHARE;
grant usage on database UDF_DEMO to share UDF_DEMO_SHARE;
grant usage on schema UDF_DEMO.PUBLIC to share
  UDF_DEMO_SHARE;
grant usage on function UDF_DEMO.PUBLIC.get_market_basket(number)
  to share UDF_DEMO_SHARE;
alter share UDF_DEMO_SHARE add accounts=<consumer account id>;
```

Function 3:

```
use role accountadmin;
create database UDF_TEST from share <provider_account>.UDF_DEMO_SHARE;
grant imported privileges on database UDF_TEST to role PUBLIC;
use database UDF_TEST;
select * from table(UDF_TEST.PUBLIC.get_market_basket(6139));
```

| INPUT_ITEM | BASKET_ITEM_SK | NUM_BASKETS |
|---|---|---|
| 6139 | 6139 | 1048 |
| 6139 | 7115 | 405 |
| 6139 | 7114 | 189 |
| 6139 | 9257 | 128 |
| 6139 | 9256 | 102 |
| 6139 | 7116 | 95 |
| 6139 | 9258 | 40 |
| 6139 | 23492 | 37 |
| 6139 | 40008 | 10 |

In an eighth use case, the exchange management module 106 may provide usage statistics of a listing 202 by one or more consumers 404 to the provider 402 of the listing, e.g. queries, credits used, tables scanned, tables hit, etc.

In a ninth use case, the systems and methods disclosed herein are used for industry-specific applications. For example:

1. Cybersecurity
   a. Allows for sharing of risk vectors, bad actors, IP white/black lists, realtime attacks in progress, known good/bad emailers, etc.

2. Healthcare
a. Secure sharing of patient/outcome/cost etc. information
b. Secure multi-hospital databases so patients can share their information to multiple providers. (e.g., if I travel to Florida and end up in the ER, they can access my records from disparate hospitals and providers.)

Other industries may also benefit from private or public sharing of data according to the systems and methods disclosed herein. Such as the financial services industry, telecommunications industry, media and advertising industry, government agencies, militaries, and intelligence agencies.

In a tenth use case, a first user provides marketing services for a second user and therefore the second user shares a customer list with the first user. The first user shares data regarding a marketing campaign to the second user, such as campaign metadata, current user events (session start/end for specific users, purchases for specific users, etc.). This may be accomplished using the bi-directional sharing of FIG. 6. This data may be joined (customer list+customer events from first user) in order to obtain a better understanding about events for a specific user or groups of users. As noted above, this exchange of data may be performed without creating copies or transferring data—each user accesses the same copy of the shared data. Since no data is transferred, the data may be accessed in near real time as customer events occur.

For example, the second user may share a customer profile table without personal identification information (PII) but that includes rows and columns of non-PII customer data, which may include one or more columns including a key/value array. The exchange management module 106 may convert this data to a stream of JSON updates and share these with the first user, such as by way of an API of the first user. For example, the updates may be of the form of {member ID, Timestamp, JSON of new/changed attributes}. In some embodiments, the exchange management module may draw a reference architecture or define an output table based on the shared data for use by the first user.

Figure 8:
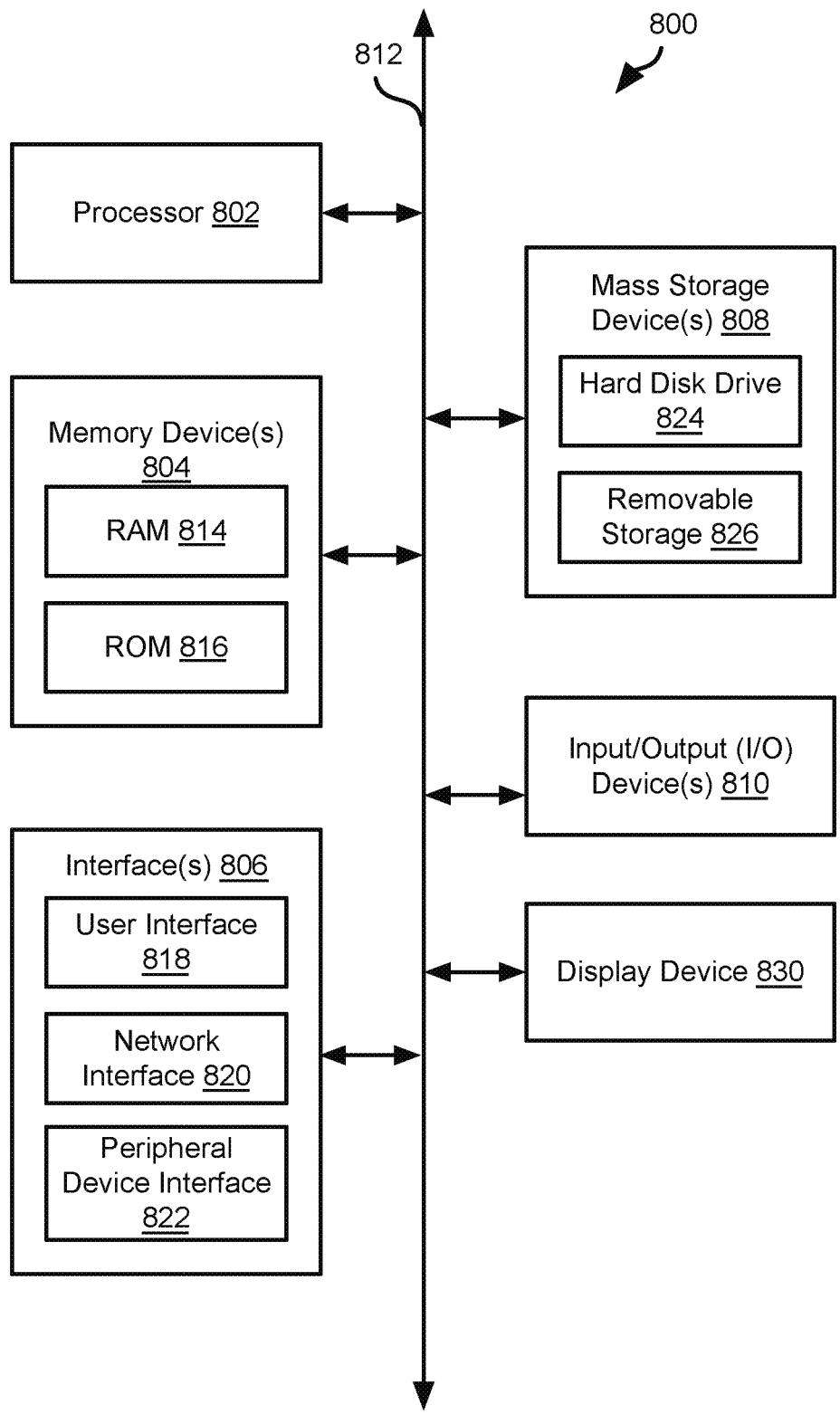
FIG. 8 is a block diagram depicting an example computing device.

FIG. 8 is a block diagram depicting an example computing device 800. In some embodiments, computing device 800 is used to implement one or more of the systems and components discussed herein, such as the cloud computing platform 102 and user devices 126. Computing device 800 may be used to perform various procedures and tasks, such as those discussed herein. Computing device 800 can function as a server, a client or any other computing entity. Computing device 800 can be any of a wide variety of computing devices, such as a desktop computer, a notebook computer, a server computer, a handheld computer, a tablet, and the like.

Computing device 800 includes one or more processor(s) 802, one or more memory device(s) 804, one or more interface(s) 806, one or more mass storage device(s) 808 (hard disk drive 824, removable storage 826, etc.), and one or more Input/Output (I/O) device(s) 810, all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM)). Memory device(s) 804 may also include rewritable ROM 816, such as Flash memory.

Mass storage device(s) 808 include various computer readable media, such as magnetic tapes, magnetic disks, optical disks, solid state memory (e.g., Flash memory), and so forth. Various drives may also be included in mass storage device(s) 808 to enable reading from and/or writing to the various computer readable media. Mass storage device(s) 808 include removable media and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices 830, speakers, printers, network interface cards, modems, lenses, CCDs or other image capture devices, and the like.

Interface(s) 806 include various interfaces that allow computing device 800 to interact with other systems, devices, or computing environments. Example interface(s) 806 include a user interface 818 or any number of different network interfaces 820, such as interfaces to local area networks (LANs), wide area networks (WANs), wireless networks, and the Internet. Interfaces 806 may further include interfaces 822 to peripheral devices.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
creating a first listing in a data exchange, the first listing referencing a first database of a plurality of databases and specifying identity-based sharing of the first database, wherein the identity-based sharing is configured to filter access to first data of the first database based on identity data associated with an access request to the first data;

creating, by a hardware processor, a second listing in the data exchange associated with a provider and specifying identity-based sharing of a second database of the plurality of databases, the second listing referencing the second database of the plurality of databases and the first data of the first database filtered according to the identity-based sharing of the first database as filtered based on the identity data associated with the provider; and receiving an instruction from a user of the data exchange, the instruction referencing the second listing and instructing addition of the second listing to a set of consumed data shares accessible by the user.

2. The method of claim 1, further comprising:
processing a query directed to the second database and the data of the first database referenced by the second listing, wherein the query accesses filtered data from the first database and filtered data from the second database.

3. The method of claim 2, wherein the query is processed without creating a copy of the first database or the second database.

4. The method of claim 2, wherein the query is processed according to first access controls associated with the first listing and second access controls associated with the second listing.

5. The method of claim 1, further comprising:
receiving a request to modify the first listing of the data exchange to reference the second listing; and
rejecting the request based on the referencing of the second listing to the data of the first database.

6. The method of claim 1, wherein the provider associated with the second database is a second provider, wherein the first listing is associated with a first provider of the data exchange,
wherein the set of consumed shared accessible by the user is a first set of consumed shares, and
wherein creating the second listing comprises adding the first listing to a second set of consumed shares accessible by the second provider.

7. The method of claim 1, wherein creating the second listing comprises creating a secure view of the second database and the data of the first database based on the identity-based sharing of the first database.

8. A system comprising:
a memory; and
a processor, operatively coupled to the memory, the processor to:
create a first listing in a data exchange, the first listing referencing a first database of a plurality of databases and specifying identity-based sharing of the first database, wherein the identity-based sharing is configured to filter access to first data of the first database based on identity data associated with an access request to the first data;
create a second listing in the data exchange associated with a provider and specify identity-based sharing of a second database of the plurality of databases, the second listing referencing the second database of the plurality of databases and data of the first database filtered according to the identity-based sharing of the first database as filtered based on the identity data associated with the provider; and
receive an instruction from a user of the data exchange, the instruction referencing the second listing and instructing addition of the second listing to a set of consumed data shares accessible by the user.

9. The system of claim 8, the processor further to:
process a query directed to the second database and the data of the first database referenced by the second listing, wherein the query accesses filtered data from the first database and filtered data from the second database.

10. The system of claim 9, wherein the query is processed without creating a copy of the first database or the second database.

11. The system of claim 9, wherein the query is processed according to first access controls associated with the first listing and second access controls associated with the second listing.

12. The system of claim 8, the processor further to:
receiving a request to modify the first listing of the data exchange to reference the second listing; and
rejecting the request based on the referencing of the second listing to the data of the first database.

13. The system of claim 8, wherein the provider associated with the second database is a second provider, wherein the first listing is associated with a first provider of the data exchange,
wherein the set of consumed shared accessible by the user is a first set of consumed shares, and
wherein creating the second listing comprises adding the first listing to a second set of consumed shares accessible by the second provider.

14. The system of claim 8, wherein creating the second listing comprises creating a secure view of the second database and the data of the first database based on the identity-based sharing of the first database.

15. A non-transitory computer-readable medium having instructions stored thereon which, when executed by a processor cause the processor to:
create a first listing in a data exchange, the first listing referencing a first database of a plurality of databases and specifying identity-based sharing of the first database, wherein the identity-based sharing is configured to filter access to first data of the first database based on identity data associated with an access request to the first data;
create, by the processor, a second listing in the data exchange associated with a provider and specify identity-based sharing of a second database of the plurality of databases, the second listing referencing the second database of the plurality of databases and data of the first database filtered according to the identity-based sharing of the first database as filtered based on the identity data associated with the provider; and
receive an instruction from a user of the data exchange, the instruction referencing the second listing and instructing addition of the second listing to a set of consumed data shares accessible by the user.

16. The non-transitory computer-readable medium of claim 15, the processor further to:
process a query directed to the second database and the data of the first database referenced by the second listing, wherein the query accesses filtered data from the first database and filtered data from the second database.

17. The non-transitory computer-readable medium of claim 16, wherein the query is processed without creating a copy of the first database or the second database.

18. The non-transitory computer-readable medium of claim 16, wherein the query is processed according to first access controls associated with the first listing and second access controls associated with the second listing.

19. The non-transitory computer-readable medium of claim 15, wherein the provider associated with the second database is a second provider, wherein the first listing is associated with a first provider of the data exchange,
wherein the set of consumed shared accessible by the user is a first set of consumed shares, and
wherein creating the second listing comprises adding the first listing to a second set of consumed shares accessible by the second provider.

20. The non-transitory computer-readable medium of claim 15, wherein creating the second listing comprises creating a secure view of the second database and the data of the first database based on the identity-based sharing of the first database.

* * * * *